(12) United States Patent
Stark

(10) Patent No.: US 6,174,114 B1
(45) Date of Patent: Jan. 16, 2001

(54) DRAW-IN NIPPLE FOR A PALETTE OR CLAMP-ON PLATE FOR SECURING WORKPIECES FOR THE PURPOSE OF METAL MACHINING

(76) Inventor: Emil Stark, Kommingerstr. 48, A-6840 Götzis (AT)

( * ) Notice: Under 35 U.S.C. 154(b), the term of this patent shall be extended for 0 days.

(21) Appl. No.: 09/025,291

(22) Filed: Feb. 13, 1998

(30) Foreign Application Priority Data

Feb. 14, 1997 (DE) .............................................. 197 05 684

(51) Int. Cl.[7] ...................................................... B23D 7/08
(52) U.S. Cl. ............................. 409/225; 269/21; 269/43; 269/99; 409/164; 409/174; 409/197; 409/218; 409/219
(58) Field of Search ................................ 269/21, 43, 99; 409/164, 174, 197, 218, 219, 225

(56) References Cited

U.S. PATENT DOCUMENTS 4,512,068 * 4/1985 Piotrowski ............................ 409/174
4,856,349 * 8/1989 Huser ................................. 73/862.54

FOREIGN PATENT DOCUMENTS

| 29 03 622 A1 | 8/1980 | (DE) . |
| 41 35 418 A1 | 5/1993 | (DE) . |
| 40 23 583 C2 | 6/1993 | (DE) . |
| 49 07 036 C1 | 7/1994 | (DE) . |
| 43 41 743 A1 | 6/1995 | (DE) . |
| 44 02 660 A1 | 8/1995 | (DE) . |

* cited by examiner

Primary Examiner—Andrea L. Pitts
Assistant Examiner—Monica Smith
(74) Attorney, Agent, or Firm—Lackenbach Siegel Marzullo Aronson & Greenspan, P.C.

(57) ABSTRACT

Described is a draw-in nipple for fastening a palette on a machine tool, with the draw-in nipple for fastening of the palette being received by a rapid-action clamping system, with the draw-in nipple being attached afflicted with clearance on the palette and through application of a tension force in its longitudinal direction away from the palette being lockable free of clearance. The draw-in nipple is herein preferably received in a resilient element which upon exertion of a tension force becomes deformed and locked through the draw-in nipple.

13 Claims, 3 Drawing Sheets

DRAW-IN NIPPLE FOR A PALETTE OR CLAMP-ON PLATE FOR SECURING WORKPIECES FOR THE PURPOSE OF METAL MACHINING

BACKGROUND OF THE INVENTION

1. Field of the Invention

Subject matter of the invention is a draw-in nipple and its securement in a palette or clamp-on plate.

2. Description of Related Art

Such draw-in nipple and its securement are known for example through the subject matter of DE 41 35 418.4 by the same applicant.

The disclosure content of this prior publication is intended to be fully included by the present disclosure.

In the prior configuration the draw-in nipple is attached fixedly to a clamp-on plate or palette on the underside or top side of the palette and therefore has substantially no motion play. Such palettes in connection with draw-in nipples serve for the purpose of clamping the palette in a working center wherein the draw-in nipples engage rapid-action clamping cylinders which, by means of spring-resilient force or by means of other media, draw the draw-in cylinder in the direction of its longitudinal axis into this rapid-action clamping cylinder in order to connect in this way the palette or clamping plate fixedly with the rapid-action clamping system. In a manner known per se the palette or the clamping plate supports mountings for clamping in workpieces to be worked.

In the following for the sake of simplicity only one palette is discussed, but by it is understood that a rapidly exchangeable clamping plate also be implemented so as to be turnable so that it can be clamped in at different orientations into a rapid-action clamping system.

In the prior patent application the disadvantage existed that the particular draw-in nipple was fixedly screwed on plane-parallel surfaces of the clamp-on plate with the aid of screws and accordingly was fastened on the plate virtually immovably. Due to the installation this known draw-in nipple was provided with a clearance of approximately 2 to 3/1000 mm in order to attain a favorable mounting on the palette. This clearance is moreover still required in order to attain the ready removal of the entire palette from the rapid-action clamping system. For the palette must be tilted by a few thousandths mm in order to make possible the highly favorable pulling out of all draw-in nipples from the associated rapid-action clamping cylinders.

But in many cases such clearance is undesirable and should be eliminated in particular in the case of the palette tightly clamped in the rapid-action clamping system since it leads to fabrication inaccuracies.

SUMMARY OF THE INVENTION

The invention is therefore based on the task of further developing a palette with fastening of draw-in bolts of the above cited type in such a way that with draw-in nipples locked in the rapid-action clamping system the palette is connected free of clearance with the draw-in nipples and that during the detachment of the palette from the rapid-action clamping system the nipples have clearance.

Of importance in the present invention is that the clamping of the palette in a rapid-action clamping system takes place in such a way that the rapid-action clamping cylinders always exert a tension force substantially perpendicularly to the plane of the palette onto the associated draw-in nipples in the clamped state such that these nipples are always prestressed in the direction of their longitudinal axis.

According to the invention the securement of the draw-in nipples in associated pocket bores of the palette is now implemented so that due to this tension force acting in the longitudinal direction of the draw-in nipples the lateral clearance (leading to the swiveling of the draw-in nipples) is eliminated if a tension force acts onto the draw-in nipples and is retained while, if the tension is no longer active, to the draw-in nipples a swivel play [clearance] is again assigned so that during the detachment of the rapid-action clamping cylinders the palette with its draw-in nipples can be readily tilted again and therefore can se readily removed from the rapid-action clamping system.

Consequently, the essence of the invention is that a condition-adapted clearance release is assigned to the draw-in nipples, i.e. the clearance is eliminated if the draw-in nipples are under tension force and the clearance is again assigned to the draw-in nipples if the tension force is removed.

In a first preferred embodiment this is attained thereby that the draw-in nipple is held in a pocket bore in the region of the palette with the aid of a conical ring, which conical ring is disposed, in turn, in a mounting flange.

Between the draw-in nipple and the conical ring in the direction of tension on the draw-in nipples (in the longitudinal direction of the draw-in nipple) conical surfaces are disposed at an angle in addition to this which lead to the fact that upon the action of a tension force onto the draw-in nipples these conical surfaces shift radially outwardly and thereby displace the conical ring radially outwardly and herein simultaneously a displacement force directed radially outwardly is exerted onto the mounting flange adjoining the conical ring radially outwardly.

It is herein important that the fitting face which ensures the full seat (clearance-free seat) of the draw-in nipple in the rapid-action clamping cylinder is disposed on the radially outer circumference of the mounting flange. This outer circumference extends into an associated fitting bore in the rapid-action clamping cylinder and comes to rest clearance-free on the inner circumference of this associated fitting bore.

Therewith the technical teaching according to the present invention is fulfilled that under the action of a tension force which acts in the longitudinal direction on the draw-in nipple the conical ring is displaced radially outwardly and it the conical ring simultaneously displaces radially outwardly the mounting flange, disposed radially outward, and expands it so that it mounting flange with its fitting bore rests completely clearance-free and secured all-around in the fitting bore. Therewith the draw-in force is also substantially increased because the mounting flange extends virtually force- and form-fittingly into the fitting bore and a very good oversized draw-in force exists between the draw-in nipple and the associated clamping cylinder.

In another embodiment of the present invention it is provided that, instead of the use of conical surfaces which are implemented obliquely in the direction toward the draw-in direction of the draw-in nipple, circular-profile spherical surfaces are used which also lead to a radial expansion of a mounting flange which consequently also comes to rest force- and form-fittingly on the inner circumference of the associated fitting bore when the draw-in nipple is clamped tightly.

This draw-in nipple is supported substantially so as to carry out swivel motions, i.e. in the resting state it is afflicted with such clearance that it can carry out a swivel motion about its longitudinal axis wherein the center of the swivel is approximately in the region of the palette. But as soon as a corresponding draw-in force is exerted onto this draw-in nipple, it becomes stabilized in its seat due to the spherical surfaces and the associated conical surfaces in the region of the mounting flange, which cooperate in order to displace in this way the mounting flange radially outwardly and to bring the fitting faces disposed on the radially outer circumference into force- and form-fit engagement on the inner circumference of the fitting bore of the clamping cylinder.

In a third embodiment the draw-in nipple is supported in a spring-resilient element which, in turn, is fastened in a fitting bore of the palette, for example via a ring. But here any other suitable form of fastening can also be used.

The contact faces between draw-in nipple and spring-resilient element are at least partially conical or spherical.

With a tension force onto the draw-in nipple the spring-resilient element becomes deformed so that the draw-in nipple is fixed free of clearance on the palette.

The previously cited fitting faces for centering in the clamping cylinder in this embodiment are disposed preferably directly on the draw-in nipple, thus they are not expanded. However, here also through a corresponding formation of the spring-resilient element it is possible to make available these fitting faces directly on the spring-resilient element so that these are also expanded during the drawing-in of the draw-in nipple.

It is important in the embodiment examples that, as soon as the tension force is removed from the draw-in nipples, these so-to-speak spring back again into their pocket bore in the palette and again assume their previous clearance so that the palette implemented in this way can be lifted off the rapid-action clamping system simply through slight tilting.

It is herein preferred that the rapid-action clamping cylinder is implemented so that the piston bottom presses onto the head of the draw-in nipple so that it is lifted out of the fitting. In addition to the excellent and oversized holding force between the draw-in nipple and the associated fitting bore of the clamping cylinder, the ready detachment of the draw-in nipple from this clamping cylinder is additionally also ensured.

The inventive subject matter of the present invention is not only evident on the basis of the subject matter of the individual patent claims but also based on the combination with one another of the individual claims.

All specifications and characteristics disclosed in the documents including the abstract, in particular the spatial implementation depicted in the drawings are claimed as being essential to the invention to the extent they are novel individually or in combination relative to prior art.

BRIEF DESCRIPTION OF THE DRAWINGS

In the following the invention will be explained in further detail in conjunction with drawings depicting several ways of embodiment. Further characteristics and advantages of the invention are evident based on the drawings and their description.

In the drawings show:

FIG. 1, FIG. 3: top view onto a second embodiment example according to FIG. 4

DESCRIPTION OF THE PREFERRED

Figure 2:
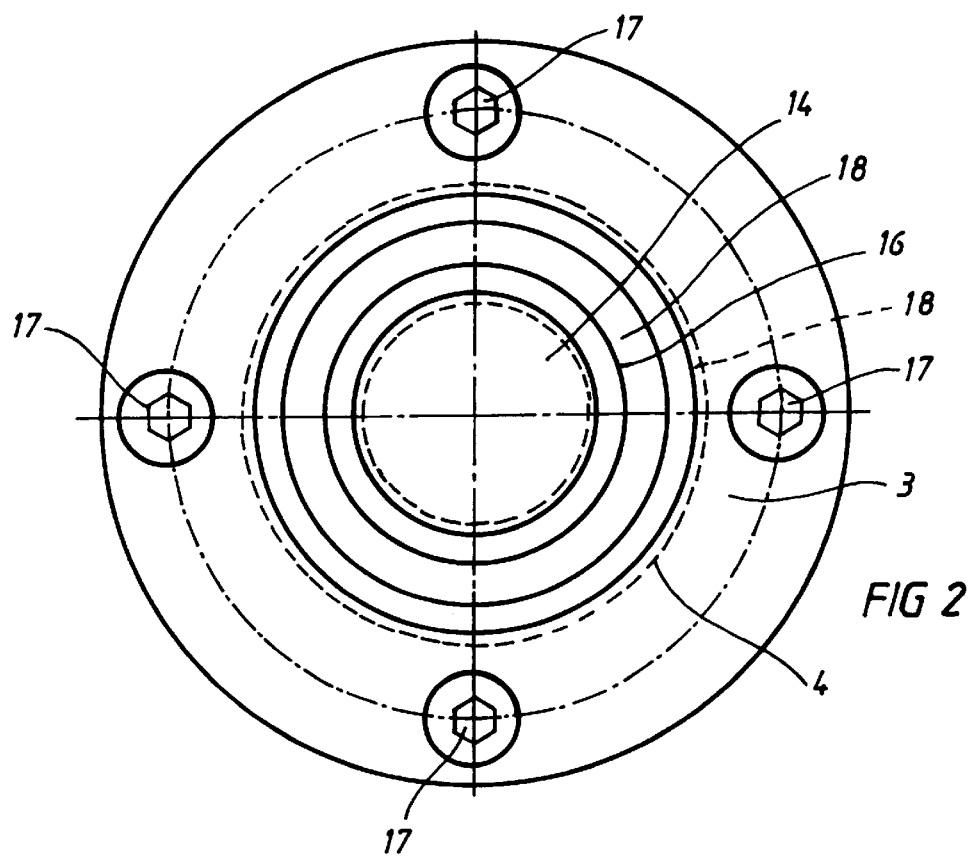
FIG. 2: top view onto

In a palette 1 is disposed a pocket bore 2 in which a draw-in nipple 14 is supported swiveling and provided with a clearance. Herein in the rocket bore 2 initially a mounting flange 3 is set which is fully in contact with its outer circumferential surfaces on the associated inner circumferential surfaces of the pocket bore 2. Between these contact faces between the mounting flange 3 and the pocket bore 2 no clearance is provided.

The mounting flange 3 is herein anchored in the pocket sore 2 of the palette 1 with screws distributed uniformly on the circumference.

On the inner circumference of the mounting flange 3 is disposed a conical ring 18 and the conical ring 18, in turn, bears in its interior the draw-in nipple 14.

It is herein important that the draw-in nipple in the region of contact with the conical ring 18 comprises conical surfaces 8 extending obliquely inwardly, which consequently form an angle with the longitudinal axis (direction of arrow 15) of the draw-in nipple 14.

The oblique inner conical surfaces 8 are adjoined by faces 9 oriented in the vertical direction which are provided by clearance.

The contact faces between the conical ring 18 and the associated mounting flange 3 are implemented as follows:

A vertical face 7 provided with clearance 11 changes over into a horizontal clearance-free face 6 which, in turn, changes over into a face 27 provided partially with clearance 12. It is herein important that starting from the horizontal face 6 the clearance 12 goes only up to position 13 while beyond the position 13 in the direction of arrow 15 the further face 27 is implemented free of clearance.

The inner horizontal surface 5 of the mounting flange 3 has no function and is set back relative to the outer surface of palette 1.

It is now important that on the radially inner circumference of the mounting flange 3, fitting faces 4, directed radially outwardly and rounded off (cambered), are adjoined, with the fitting faces 4 changing over in the downward direction in direction of arrow 15 into a radius 20.

This radius 20 is intended as a protective radius in order to introduce the entire extension 28 of the conical ring 18 into the fitting bore (not shown in further detail in the drawings) of the clamping cylinder. In the inserted state the fitting faces 4 come to rest in contact on the associated inner circumference of the fitting bore of the clamping cylinder with the front face of the clamping cylinder abutting on surface 29 of the palette and supporting itself there.

The clamping cylinder comprises spheres which come into contact as a ball cage into the associated recesses 16 on the head of the draw-in nipple 14 and form a form-fitting connection between the draw-in nipple 14 and the clamping elements of the clamping cylinder. The draw-in nipple 14 is therewith pulled in the direction or arrow 15 into the clamping cylinder with the clamping cylinder simultaneously being supported on the clamping surface 29. Therewith the palette 1 is pulled free of clearance into the clamping cylinder because during the exertion of the tension force onto the draw-in nipple 14 in the direction of arrow 15 a clearance-eliminating stabilization of the draw-in nipple in the pocket bore 2 takes place.

This occurs thereby that the conical surfaces 8 of the draw-in ripple slide along the associated conical surfaces of conical ring 18 and it [the latter] is displaced obliquely downwardly and outwardly and this displacement motion is transmitted from the extension 30 of the conical ring 18 onto the extension 28 of the mounting flange 1. Therewith the fitting face 4 shifts in the radial direction (direction of arrow 19) toward the outside and thus the draw-in nipple 14 is anchored free of clearance in the fitting bore of the clamping cylinder.

Simultaneously the clearance 10 between the inner face of the draw-in nipple 14 and the bottom of the pocket bore 2 is increased in addition.

If, in contrast, the tension force in the direction of arrow 15 is removed, a reverse deformation occurs and the clearance 10 is decreased with it simultaneously however being retained to a decreased extent so that with the tension force removed the draw-in nipple can be tilted in the pocket bore 2.

Figure 3:
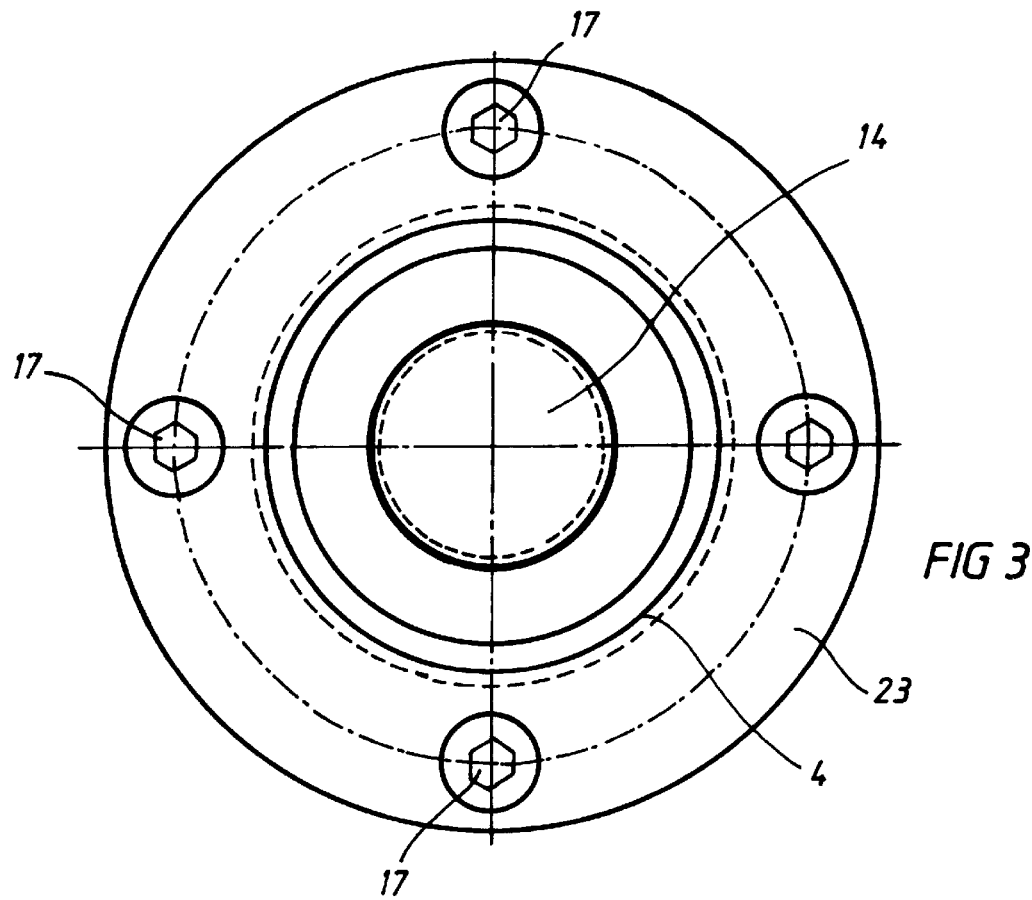
Figure 4:
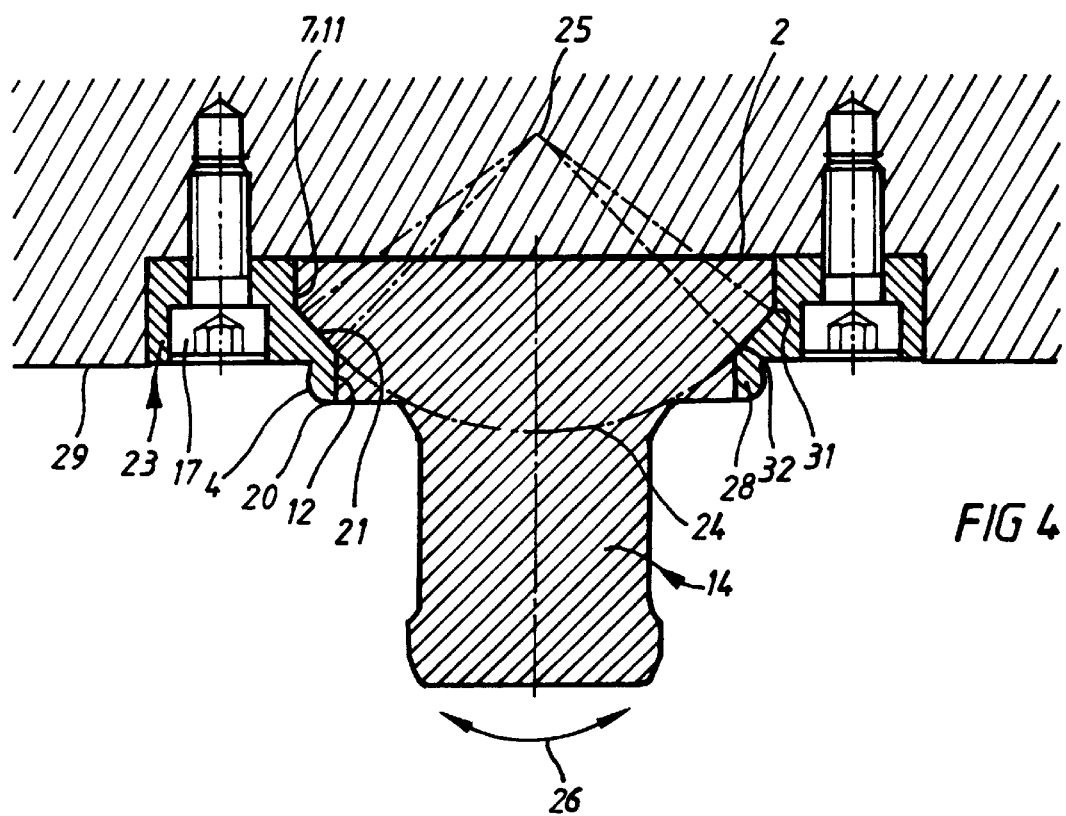
FIG. 4: section through a second embodiment example.

A similar embodiment is shown in conjunction with FIGS. 3 and 4 wherein to the draw-in nipple 14 even a swiveling motion in direction of swivel 26 is assigned.

In this embodiment example the conical ring 18 can be omitted and the mounting flange 23, used instead of mounting flange 3, partially also assumes the functions of the previously present conical ring 18.

It is herein important that starting from the face 7 provided with clearance 11 this face is adjoined by a spherical surface 21 which is disposed in the region of a spherical radius 24 with the sphere center 25 being disposed in the region of palette 1 centrally with respect to the longitudinal center axis of the draw-in nipple 14.

The spherical surface consequently starts at position 31 and ends at position 32. The position 32, in turn, is adjoined, viewed in the longitudinal direction of the draw-in nipple 14, by face 9 afflicted with clearance 12.

Likewise, the face is provided with clearance 10 is present at the base of draw-in nipple 14.

Figure 1:
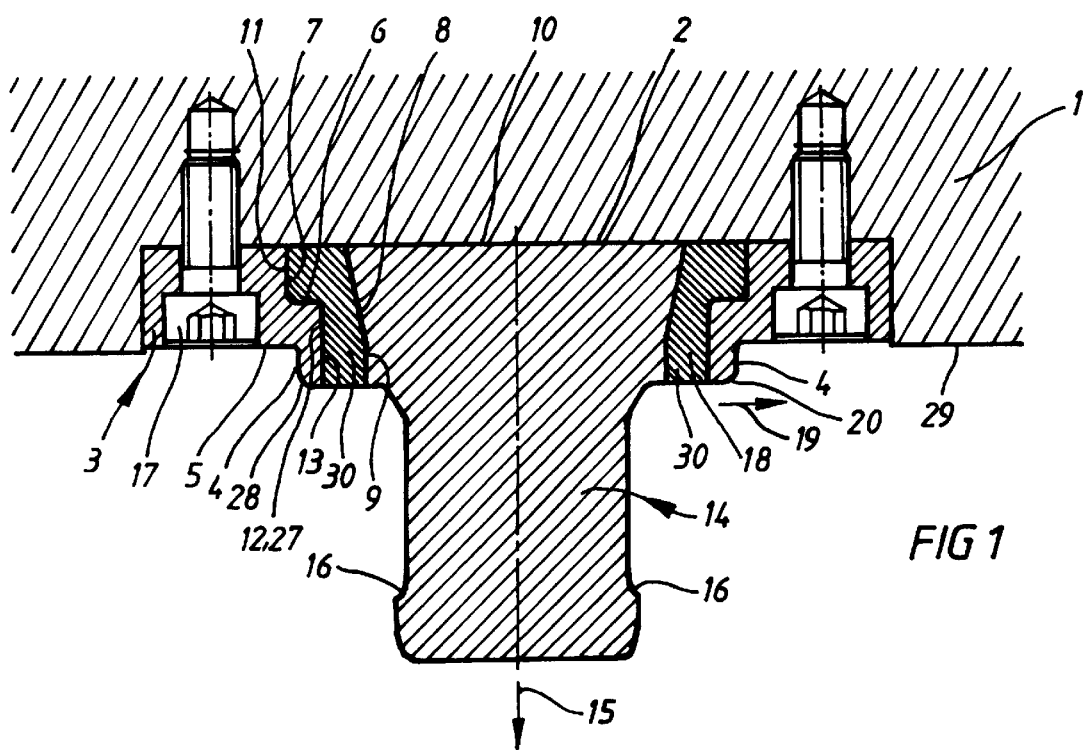
FIG. 1: section through a first embodiment of the fastening of a draw-in nipple in a palette.

In the state shown thus the draw-in nipple 14 can execute motions in swivel direction 26. If, however, in direction of arrow 15 a force is exerted onto it, a relative displacement of the spherical surfaces 21 of the draw-in nipple occurs with the spherical surfaces of the mounting flange 23, whereby, again, the extension 28 of the mounting flange 23 is displaced radially outwardly in the direction of arrow 19 (FIG. 1) and herein the fitting face 4 executes an identical radial displacement motion. Hereby the clearance-free contact of this fitting face 4 on the associated inner circumference of the bore in the clamping cylinder occurs.

Figure 5:
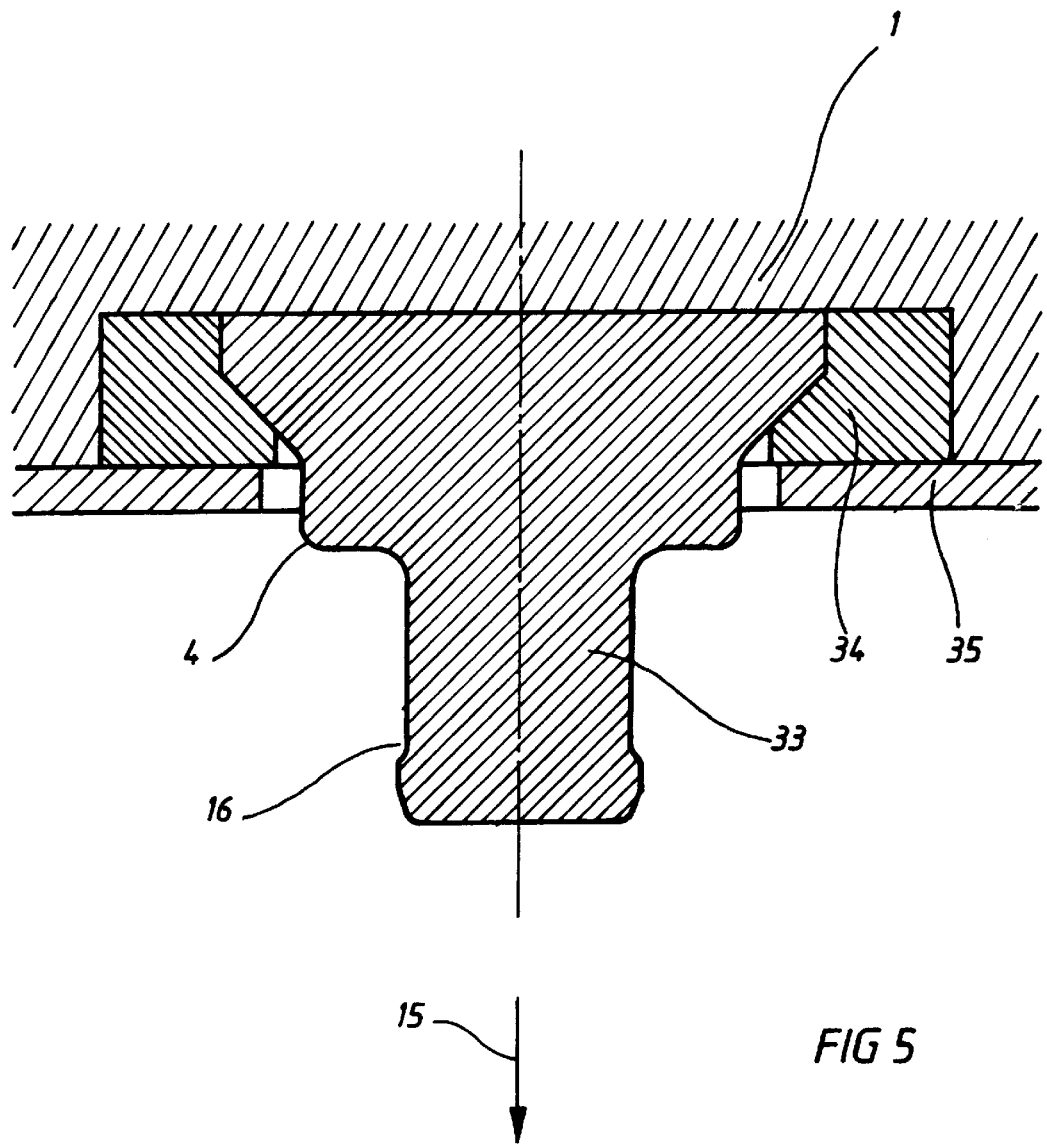
FIG. 5: section through a third embodiment example.

FIG. 5 shows a further embodiment similar to FIG. 4. The draw-in nipple 38 is received in a palette 1. Its lower end extends in places conically as can be seen in FIG. 5. The support of the draw-in nipple 33 takes place via a spring-resilient element 34 which is held via a ring 35 in the bore.

If now in the direction of arrow 15 a force is exerted onto the draw-in nipple 33, it comes to rest with its conical surfaces in contact on the associated surfaces of the spring-resilient element 34 and deforms it. The deformation leads to a locking of the draw-in nipple 33, for example thereby that the spring-resilient element 34 is radially expanded.

It is important in all embodiment examples that the clearance is only eliminated upon action of a tension force onto the draw-in nipple with the tension force acting in the direction toward the longitudinal axis of the draw-in nipple, while, if the tension force is removed, the draw-in nipple receives again a limited swivel play.

Drawing Legend

1. Palette
2. Pocket bore
3. Mounting flange
4. Fitting face
5. Surface
6. Face
7. Face
8. Conical surface
9. Face
10. Clearance
11. Clearance
12. Clearance
13. Position
14. Draw-in nipple
15. Direction of arrow
16. Recess
17. Screw
18. Conical ring
19. Direction of arrow
20. Radius
21. Spherical surface
23. Mounting flange
24. Spherical radius
25. Center
26. Direction of swivel
27. Face
28. Extension (mounting flange)
29. Surface
30. Extension (conical ring)
31. Position
32. Position
33. Draw-in nipple
34. Spring-resilient element
35. Ring

I claim:

1. Fastening device for fastening a work on a machine tool, comprising a palette defining an exterior generally flat surface, said palette having a bore defining a bore axis generally normal to said flat surface; a generally elongate draw-in nipple defining a nipple axis and having one end portion received within said bore and having an opposing end portion extending outwardly beyond said flat surface; and retaining means on said palette for retaining said one portion within said bore and forming selected clearances about said one end portion when no tension or pulling forces are applied to said opposing end portion and for substantially eliminating said clearances when tension or pulling forces are applied to said opposing end portion to lock said draw-in nipple with said bore and nipple axes in substantial alignment, whereby said clearances are only eliminated upon application of a tension or pulling force on said draw-in nipple acting along said axes, said draw-in nipple being permitted to experience limited movements in relation to said bore axis only prior to application of tension or pulling forces.

2. Fastening device as defined in claim 1, wherein said retaining means further comprises a primary resilient structural component that receives said draw-in nipple.

3. Fastening device as defined in claim 2, wherein said retaining means comprises a secondary resilient component that encompasses said primary resilient structural member.

4. Fastening device as claimed in claim 2, characterized in that contact faces between the draw-in nipple (14, 33) and the primary resilient structural component (18, 23, 34) are at least partially conically or spherically formed.

5. Fastening device as claimed in claim 3, characterized in that contact faces between the draw-in nipple (14,33) and the primary resilient structural component (18, 23, 34) are at least partially conically or spherically formed.

6. Fastening device as claimed in claim 2, characterized in that the primary resilient structural component (18, 34) has a lateral clearance with respect to the secondary structural component (3, 1).

7. Fastening device as claimed in claim 3, characterized in that the primary resilient structural component (18, 34) has a lateral clearance with respect to the secondary structural component (3, 1).

8. Fastening device as claimed in claim 4, characterized in that the primary resilient structural component (18, 34) has a lateral clearance with respect to the secondary structural component (3, 1).

9. Fastening device as claimed in claim 5, characterized in that the primary resilient structural component (18, 34) has a lateral clearance with respect to the secondary structural component (3, 1).

10. Fastening device as claimed in claim 1, characterized in that fitting faces (4) for centering the draw-in nipple (14, 33) are present in a receiving bore of the clamping system.

11. Fastening device as claimed in claim 10, characterized in that the fitting faces (4) are formed on the draw-in nipple.

12. Fastening device as claimed in claim 10, characterized in that the fitting faces (4) are formed on a resilient component (3, 23).

13. Fastening device as claimed in claim 12 characterized in that the fitting faces (4) are expanded when the draw-in nipple (14) is locked through the tension force.

* * * * *